July 5, 1949.  R. E. TARPLEY ET AL  2,474,921

SHOCK-ABSORBING SUPPORT

Filed Sept. 29, 1945  3 Sheets-Sheet 1

INVENTORS
RAYMOND E. TARPLEY
ALBERT J. WILLIAMS, JR.
BY
Virgil E. Woodcock
ATTORNEY July 5, 1949.
R. E. TARPLEY ET AL
2,474,921
SHOCK-ABSORBING SUPPORT
Filed Sept. 29, 1945
3 Sheets-Sheet 2
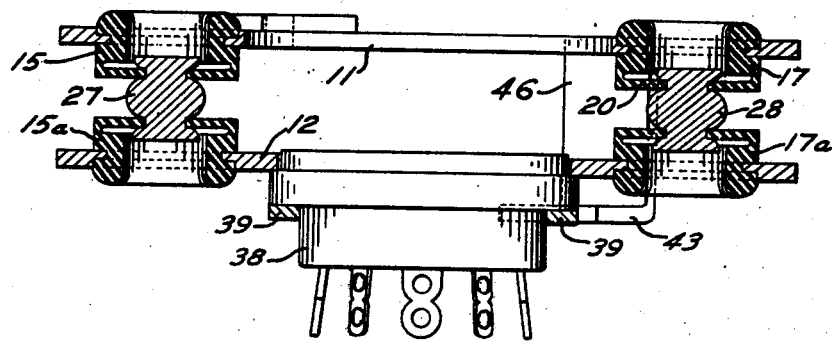
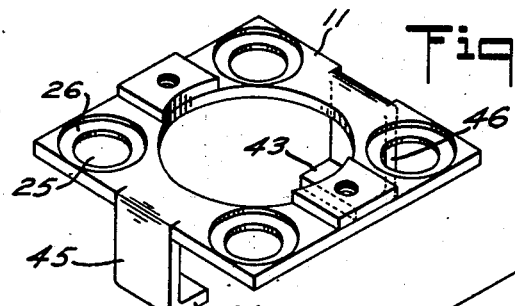
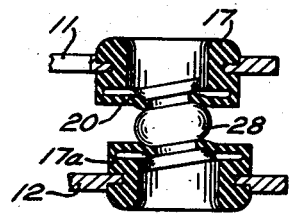
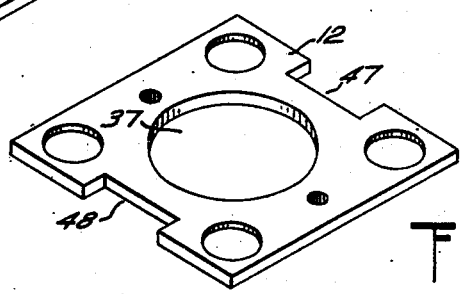
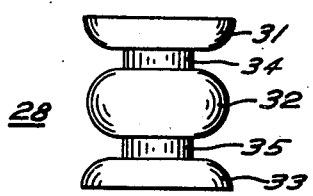
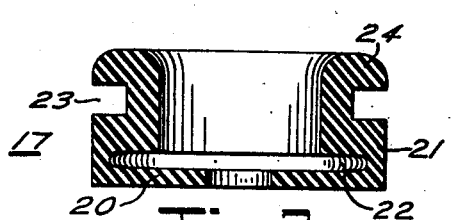
INVENTORS
RAYMOND E. TARPLEY
ALBERT J. WILLIAMS, JR.
BY
Virgil E Woodcock
ATTORNEY

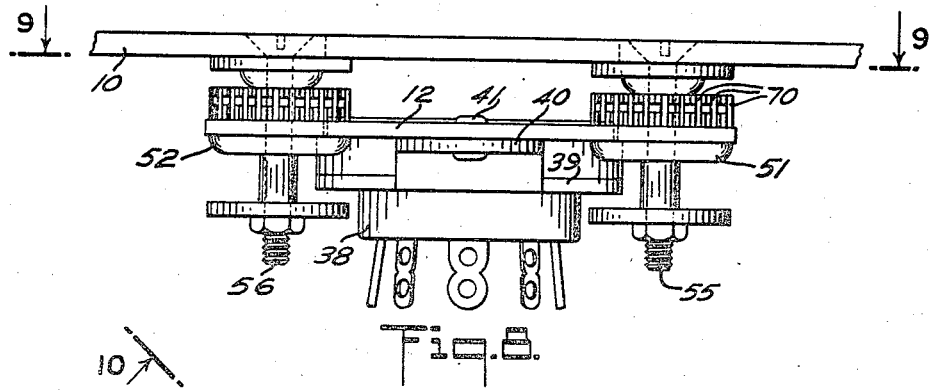
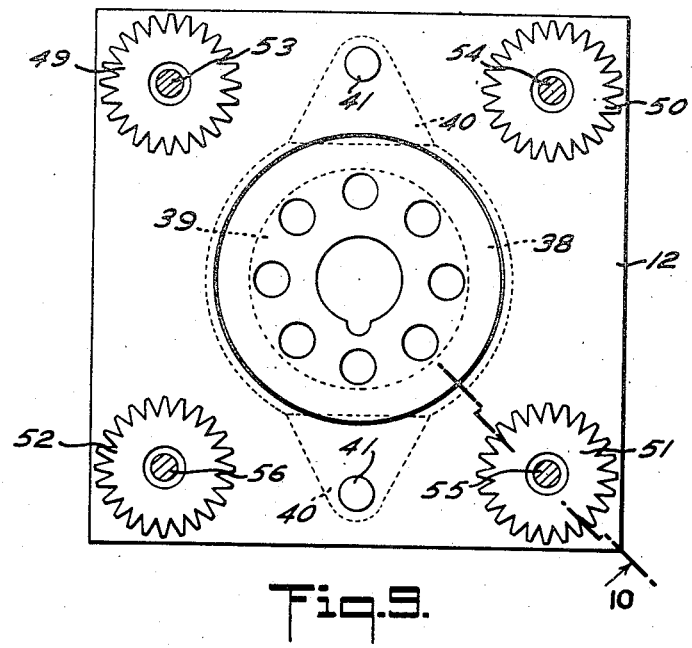
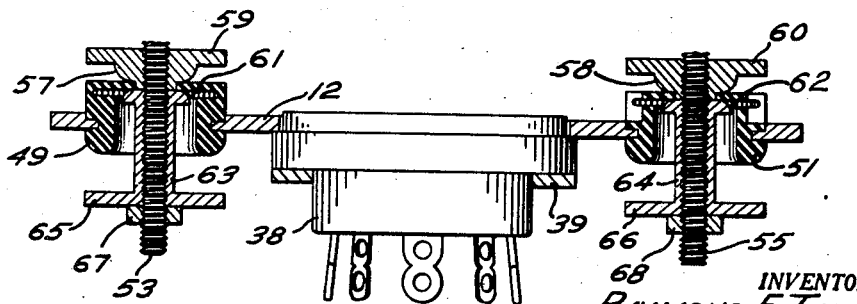

Patented July 5, 1949

2,474,921

UNITED STATES PATENT OFFICE 2,474,921

SHOCK-ABSORBING SUPPORT

Raymond E. Tarpley and Albert J. Williams, Jr., Philadelphia, Pa., assignors to Leeds and Northrup Company, Philadelphia, Pa., a corporation of Pennsylvania Application September 29, 1945, Serial No. 619,302

11 Claims. (Cl. 248—358)

This invention relates to mountings for devices deleteriously affected by vibration, such as galvanometers, electric valves or vacuum tubes and has for an object the provision of a shock absorbing and vibration damping support which will protect against injury from external blows and which will quickly damp out vibration.

The desirability of a highly damped elastic mounting for electric valves is particularly desirable and there have been many types of mountings proposed. From a theoretical standpoint, such a mounting must be relatively strong to withstand external blows or shocks and yet must be sensitive enough to take care of vibrations of small amplitudes. In either case, the mounting must be effective in rapidly absorbing the energy due to either external blows or vibrations. In meeting these requirements, there must also be considered the relatively great effort which is required to insert and remove a multiple electrode valve in and from its socket. In the structures heretofore proposed, much has been left to be desired in meeting the foregoing requirements.

In carrying out the present invention in one form thereof, there is provided rubber diaphragms extending transversely of pillars utilized for the support of the sockets in which the electronic devices are mounted. Provisions are made for so connecting each diaphragm that vibrations or shocks will produce warping of the diaphragm thereby quickly to absorb them. More specifically, grommets are removably carried by spaced supporting members. One grommet is carried by the frame and the other supports the socket of the vacuum tube or electronic device. Each grommet is provided with a diaphragm extending transversely thereof. Normally the grommets in the two supporting members are in axial alignment. There is provided for each aligned pair of diaphragms an interconnecting element which forms a pivotal connection between the associated diaphragms for converting relative translational movements between said members into warping of both of the diaphragms and upon movement of said members toward and away from each other, said elements producing simultaneous and uniform stretching or warping of the diaphragms. As used herein, the term "grommet" refers to a ring-shaped member provided at its periphery with a groove for insertion in an opening of a wall.

For a more complete understanding of the invention and for further objects and advantages thereof, reference is to be had to the following description taken in conjunction with the accompanying drawings in which:

Fig. 3 is a view, partly in section, taken on the line 3—3 of Fig. 2;

Figure 1:
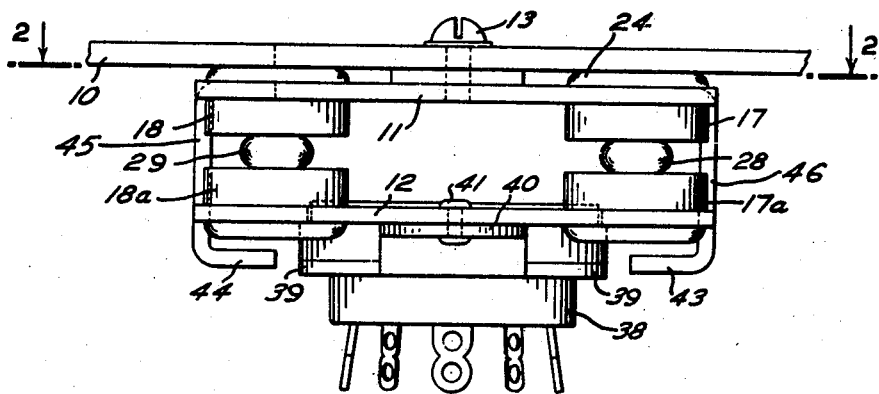
Fig. 1 is an elevation of a support embodying the invention.
Figure 2:
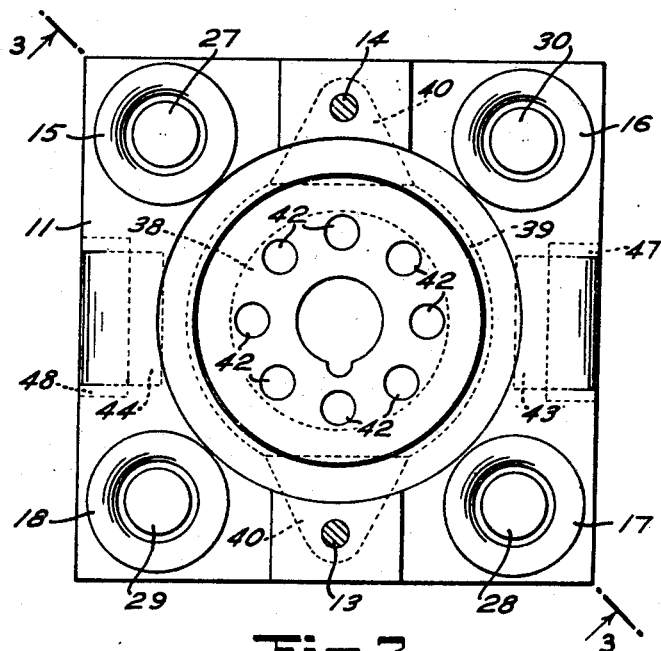
Fig. 2 is a plan view, partly in section, taken on the line 2—2 of Fig. 1.

Fig. 3-A is a fractional view of a supporting assembly and is explanatory of the operation thereof;

Fig. 4 is a perspective view of one of the supporting members of Figs. 1–3;

Fig. 5 is a perspective view of the other of the supporting members of Figs. 1–3;

Fig. 6 is an elevation of the interconnecting elements;

Fig. 7 is a sectional view of one of the grommets;

Fig. 8 is a side elevation of a modified form of the invention;

Fig. 9 is a plan view, partly in section, taken on the line 9—9 of Fig. 8 with certain parts omitted; and Fig. 10 is a view, partly in section, taken on the line 10—10 of Fig. 9.

Referring to the drawings, the invention in one form has been shown applied to the support of electronic devices from a panel or chassis 10, fractionally shown in Fig. 1. The supporting assembly comprises a pair of supporting plates or members 11 and 12. The supporting member 11 is secured to the panel or chassis 10 by means of a pair of screws 13 and 14. The supporting members 11 and 12 carry rubber grommets in similarly located or axially aligned positions. There may be three or more grommets per plate, although, in the embodiment illustrated four have been provided. More specifically, the grommets 15, 16, 17 and 18 are located at the respective corners of the supporting member 11. Additional grommets in like locations are carried by the supporting member 12, two of which, the grommets 17a and 18a, being shown in Fig. 1 and the grommets 15a and 17a being shown in Fig. 3. Each grommet, preferably of natural or synthetic rubber or other elastic material having similar damping characteristics, in the preferred form, Fig. 7, comprises a diaphragm 20 extending transversely across a thickened body portion 21. A recess 22 is provided in the body 21 adjacent the diaphragm in order to increase the effective diameter and area of the diaphragm 20. Though each grommet, such as the grommet 17 of Fig. 7, may be secured in the supporting members 11 and 12 by other suitable means, a circumferential groove 23 is provided. The grommet 17 has sufficient elasticity for deformation of a lip 24 for ready insertion into an opening 25 in the supporting member 11, Fig. 4, and for ready removal therefrom. It will be observed, Fig. 4, that the opening 25 has a diameter substantially the same as the inner diameter of the circumferential groove 23. In order to provide a thickness of the supporting member 11 around the opening 25 substantially equal to the width of the circumferential groove 23, the opening 25 may be countersunk as shown at 26. The other grommets or elastic supporting members are of like construction and are preferably mounted in the respective supporting members 11 and 12 as shown in Figs. 1, 3 and 3-A.

As best shown in Fig. 3, the grommets are disposed in the supporting members 11 and 12 with the diaphragms thereof adjacent each other. The supporting member 12 is carried by the diaphragms of the respective grommets by means of interconnecting elements, two of which, the elements 27 and 28, being shown in Fig. 3, and the remaining elements 29 and 30, being shown in Fig. 2.

The connecting elements are of like construction and only the element 28, shown in Fig. 6, need be described in detail. Three curved or toroidal sections 31, 32, and 33 are interconnected by cylindrical sections 34 and 35. As shown in Fig. 3, the length of the cylindrical sections 34 and 35 corresponds with the thickness of the diaphragms, such as the diaphragm 20.

In accordance with the invention, the interconnecting elements 27—30 cooperate with the respective diaphragm of the elements 15—18 to produce from relative movement by the supporting members 11 and 12 tensional stresses and strains in each diaphragm. The resulting action is not like that of a spring because the diaphragms have a high damping factor. They rapidly absorb and dissipate energy. Consequently, sudden jars or vibration of the panel or chassis 10 and the supporting member 11 are not transmitted to the supporting member 12 which is utilized for the support of electronic devices or the like.

It will now be assumed that the supporting member 11 receives a shock in a direction normal to its plane. Upon a downward movement of the supporting member 11, the diaphragms of the grommets 15—18 are bowed upwardly due to their engagement by the central toroidal sections. There is a stretching of each diaphragm. Simultaneously, the diaphragms of the grommets 15a—18a are bowed downwardly. The diaphragms are subjected to tensional stresses and strains and are radially elongated for absorption of energy.

If the shock causes the member 11 to move away from the member 12, the diaphragms of all the grommets are bowed outwardly or away from the body portions thereof by engagement with the enlarged ends of convex curvature of elements 27—30. Again, the diaphragms are radially elongated for absorption of energy. It will now be assumed that an applied shock moves the supporting member 11 in its own plane and to the left, as viewed in Fig. 3. The diaphragms of the grommets 15—18 thereupon move the upper ends of the elements 27—30 to the left, thus, producing counter-clockwise rotation of the elements. The overlapping toroidal sections, because of the tilting movements of the connecting elements, produce radial elongation of each diaphragm which is maximum in the direction of movement. The position of the parts for a shock of substantial magnitude has been illustrated in Fig. 3-A. It will be observed that the diaphragm of the grommet 17 has been twisted or warped. The upper toroidal or convex surface 31 has caused radial elongation on the left-hand portion of the diaphragm while the upper convex surface of the intermediate toroidal section 32 has produced radial elongation on the right-hand side of the diaphragm. The diaphragm of the grommet 17a is radially elongated on its left-hand side by the central section 32 and is radially elongated on its right-hand side by the convex surface of the lower toroidal section 33. One part of each diaphragm is moved in one direction while the opposite part thereof is moved in the opposite direction. Thus, upon pure translational movement between the supporting members 11 and 12 each diaphragm of each grommet is subjected to tensional forces which produce radial elongation in the direction of the relative movement. The tilting movement of the elements 27—30 results from the pivotal connection provided between the respective ends thereof and the associated diaphragms.

The curved toroidal sections and their convex surfaces also perform further functions. Normally, they tend to center the interconnecting elements 27—30 so that they and the lower grommets 15a—18a are coaxial with the upper grommets. For shock in any direction, the curved or toroidal sections engage an increasingly greater area of each diaphragm. Accordingly for light shocks or small relative movements the forces are applied to very small areas of the diaphragms. As the applied forces cause increasingly greater movements of the elements 27—30, the toroidal sections thereof apply the forces to gradually increasing areas of the diaphragms. Thus, the areas of the diaphragms which are radially elongated are related to the magnitudes of the forces and to the magnitude of the energy to be absorbed.

Each assembly comprises a pillar. For example, the two grommets 17 and 17a and the interconnecting element 28 form a pillar based in the supporting members 11 and 12. The elements 27—30 are readily removed from their pivotal connection with their associated diaphragms. Thus, old grommets may be readily and manually replaced, and ready accessibility is provided for servicing. Where it is desired to use a pillar which includes a single grommet, the modification of Figs. 8–10 is preferred.

The invention has been found particularly useful for mounting electronic devices such as electric valves or vacuum tubes as component parts of electronic equipment. As shown in the drawings, an opening 37, Fig. 5, is provided in the supporting member 12 for insertion therein of a socket 38. The socket is held by a clamp 39, a central portion of which encircles the lower end section of the socket, which section is of reduced diameter. Arms extend upwardly from the central section of the clamp 39 and the upper ends thereof engage the supporting member 12. In Fig. 1 the upper end 40 is secured to the supporting member 12 as by a rivet 41. It is to be understood the upper end of a similar arm is riveted to the supporting member 12 on the diametrically opposite side of the socket. It will be observed, Fig. 2, that the socket 38 is provided with a plurality of openings 42 for insertion of pins or terminals extending from the base of a thermionic tube, not shown. Such tubes may have as many as eight or more pins. Considerable force may some times be necessary to insert or to remove a tube from its socket. To prevent undue strain on the supporting pillars or assembly, stops are provided to limit extension of the pillars. These stops may be conveniently formed by the inturned ends 43 and 44 of extensions 45 and 46. The supporting member 12 is provided with recesses 47 and 48 in which are disposed the extensions 45 and 46. They limit between predetermined limits relative movement between members 11 and 12 in the plane thereof. The recesses 47 and 48 also permit insertion of the member 12 between the inturned ends 43 and 44. In the assembled position, Figs. 1-3, the ends 43 and 44 overlap with, or extend inwardly of, the recesses 47 and 48. In consequence, when a tube is inserted in the socket 38, downward pressure exerted on the socket and on the member 12 causes extension of the pillars until the member 12 engages the inturned ends 43 and 44. Sufficient pressure may then be applied to the tube without further elongation of and consequent damage to the grommets of the pillars.

In withdrawing the tube from the socket, the supporting assembly or pillars will be shortened until the respective bodies of the grommets come in contact with each other. When the body portions engage, the supporting member 12 will be brought to standstill to prevent excessive warping of the diaphragms and the necessary force may then be applied to remove the tube from the socket 38.

Now that the principles of the invention have been fully explained, it will be understood that other modifications may be made within the spirit and scope of the appended claims. For example, the invention requires that the diaphragms be effective for relative movement of the supports in any direction. Even with single-grommet assembles incorporating grommets of the type shown in Fig. 7, effective damping may be obtained by transforming all movements into warpage of the diaphragm. Thus, Fig. 3, the interconnecting elements, such as elements 27 and 28, may each be provided with pivotal mounting means such as a spherical end arranged to nest in a spherical socket carried by the supporting member 11. Any movement of the supporting member 11 in its plane will move the spherical ends of the interconnecting elements to tilt them and thus warp the diaphragms of the grommets 15a and 17a.

In the modifications of Figs. 8-10 the same reference characters have been applied to the parts corresponding with those of Figs. 1-7. In this modification, each pillar or assembly includes single grommets 49—52. Each grommet is of generally similar construction to those shown in Figs. 1-7 but they differ in certain important details to be hereinafter described. As best shown in Fig. 10, the grommets, specifically the grommets 49 and 51, are inserted in the supporting member 12 with the diaphragms disposed above the member 12. The member 12 is carried by the chassis or panel 10 by means of screws 53—56, each of which is provided with a head countersunk in the panel 10. The manner in which the supporting member 12 is supported by the grommets 49—52 is best shown in Fig. 10. Thus, curved toroidal sections 57 and 58 are formed integrally with nuts 59 and 60 carried by the screws 53 and 55. These nuts are tightened against panel 10. The toroidal sections 57 and 58 have convex surfaces which bear against the diaphragms of the grommets 49 and 51. Other curved toroidal sections 61 and 62 are provided on internally threaded members 63 and 64, each having flanges 65 and 66. The members 63 and 64 are threaded on the screws 53 and 55 so that the convex or toroidal surfaces or sections 61 and 62 bear against the diaphragms of the grommets 49 and 51. The members 63 and 64 are fixed in position by means of lock-nuts 67 and 68.

As thus constructed, the respective diaphragms of the grommets 49—51 are radially elongated whenever the panel 10 is subjected to shock in a direction normal to its plane. The action is very similar to that which takes place in the modification of Figs. 1-7.

In accordance with the invention, each of the grommets 49—52 in the region of the juncture of the diaphragm of the body has a materially reduced cross-sectional area. As shown, this reduction in area is conveniently obtained by a plurality of notches extending inwardly thereof to form a series of pillars, such as those indicated at 70, Fig. 8. By forming these relatively small supporting columns or pillars, movement of the supporting member 12 in a plane parallel to the diaphragm caused lateral displacement of the diaphragm and flexure of them. For the single-grommet assembly of Figs. 8-10 the diaphragms operate as in Figs. 1-7 for vibrations in all directions except in the plane of the diaphragm. Vibrations in the plane of the diaphragms produce a bending of the supporting columns or pillars which effectively eliminates vibration. It may be further observed that the bending of the pillars located diametrically across the diaphragm in the direction of the vibration on one side moves the diaphragm in one direction and on the other side moves it in the opposite direction. Thus, the pillars or columns warp the diaphragm further to damp out vibration.

What is claimed is:

1. A shock absorbing and vibration damping support comprising supporting members, a plurality of pillars interconnecting and separating said members, each of said pillars including a grommet having an internal rubber diaphragm extending transversely thereof, a member having one end pivotally connected to said diaphragm, and means pivotally carrying the other end of said member for subjecting said diaphragm to tensional strains upon relative movement between said supporting members in any direction.

2. A shock absorbing and vibration damping support comprising supporting members, a rubber grommet connected to one of said members, said grommet having an integral rubber diaphragm extending transversely thereof, and a member having one end pivotally connected to said diaphragm and its other end pivotally connected to the other of said members for warping said diaphragm upon any relative movement between said supporting members.

3. A shock absorbing and vibration damping support comprising supporting members, a plurality of pillars separating said members, each of said pillars including at least two rubber diaphragms spaced one from the other and extending transversely thereof, and a member having its ends respectively pivotally interconnecting said diaphragms and operable upon relative movement between said supporting members in any direction for producing movement of said diaphragm in a direction other than in the plane thereof.

4. A shock absorbing and vibration damping support comprising supporting members, at least two grommets, one carried by one of said members and the other carried by the other of said members, each of said grommets having an integral rubber diaphragm extending transversely thereof, and a member having its respective ends pivotally connected to said diaphragms for subjecting said diaphragms to tensional strains upon relative movement between said supporting members in any direction.

5. A shock absorbing and vibration damping support comprising supporting members, a plurality of rubber grommets respectively carried by said members and each having a diaphragm extending transversely thereof, the grommets on one member normally being in alignment with the grommets on the other of said members, and an element interconnecting normally aligned diaphragms and operable upon relative movement between said supporting members in any direction for producing tensional strains in said diaphragms, each of said elements having convex surfaces adjacent and facing the respective surfaces of the associated diaphragms.

6. A shock absorbing and vibration damping support comprising supporting members, a plurality of rubber grommets respectively carried by said members and each having a diaphragm extending transversely thereof, the grommets on one member normally being in axial alignment with the grommets on the other of said members, and an element interconnecting normally aligned diaphragms and operable upon relative movement between said supporting members in any direction for producing tensional strains in said diaphragms, each of said elements in the region of said diaphragms having enlarged sections on opposite sides thereof, each said section having a convex surface facing the diaphragm for progressively increasing the area of engagement therewith with increasing relative movement between said members.

7. A shock absorbing and vibration damping support comprising supporting members, a plurality of rubber grommets respectively carried by said members and each having a diaphragm extending transversely thereof, the grommets on one member normally being in axial alignment with the grommets on the other of said members, and an element interconnecting normally aligned diaphragms and forming a pivotal connection with each associated diaphragm for converting relative translational movements between said members into warping of both of said associated diaphragms.

8. A shock absorbing and vibration damping support comprising supporting members, a plurality of rubber grommets respectively carried by said members and each having a diaphragm transversely thereof, the grommets on one member normally being in axial alignment with the grommets on the other of said members, an element interconnecting normally aligned diaphragms and forming a pivotal connection with each associated diaphragm for converting relative translational movements between said members into warping of both of said associated diaphragms, and each of said elements in the region of its associated diaphragm having an enlarged section on opposite sides thereof, each section from the center of the diaphragm having a convex surface for progressively increasing the area of engagement therewith with increasing relative movement between said members.

9. A shock absorbing and vibration damping support for electronic devices comprising supporting members, a plurality of rubber grommets carried by one of said members, each of said grommets having a diaphragm extending across a thickened body section, said body section at the periphery of said diaphragm having a materially reduced cross-sectional area to provide for movement in the plane of said diaphragm, and an element pivotally carried by said diaphragm and connected to the other of said members for producing tensional strains in said grommets upon any relative movement between members in any direction.

10. A shock absorbing and vibration damping support for electronic devices comprising supporting members having a plurality of aligned openings, a plurality of replaceable rubber grommets disposed within said openings, each of said grommets having a diaphragm extending across a thickened body section thereof, and an element pivotally connected at one end to a diaphragm carried by one of said members and pivotally connected at its opposite end to a diaphragm carried by the other of said members for producing tensional strains in said grommets upon any relative movement between members in any direction.

11. A shock absorbing and vibration damping support for electronic devices comprising supporting members, a plurality of rubber grommets carried by one of said members, each of said grommets having a diaphragm extending across a thickened body section, said body section at the periphery of said diaphragm having a plurality of notches materially to reduce the cross-sectional area thereof and to form elastic elements interconnecting said body portion and said diaphragm for movement of the diaphragm along the plane thereof, and an element carried by said diaphragm and connected to the other of said members for producing tensional strains in said grommets upon any relative movement between members in any direction.

RAYMOND E. TARPLEY.
ALBERT J. WILLIAMS, Jr.

REFERENCES CITED

The following references are of record in the file of this patent:

UNITED STATES PATENTS

| Number | Name | Date |
| --- | --- | --- |
| 1,564,770 | Eynon | Dec. 8, 1925 |
| 2,083,277 | Scott | June 8, 1937 |
| 2,268,306 | Sarti | Dec. 30, 1941 |
| 2,393,071 | Schaelchlin | Jan. 15, 1946 |